United States Patent [19]
Arroyo et al.

[11] Patent Number: 5,577,147
[45] Date of Patent: * Nov. 19, 1996

[54] MAGNETICALLY LOCATABLE OPTICAL FIBER CABLES CONTAINING INTEGRATED MAGNETIC MARKER MATERIALS

[75] Inventors: Candido J. Arroyo, Lithonia, Ga.; Sungho Jin, Millington; Thomas T. M. Palstra, New Providence, both of N.J.

[73] Assignee: Lucent Technologies Inc., Murray Hill, N.J.

[ * ] Notice: The term of this patent shall not extend beyond the expiration date of Pat. No. 5,305,410.

[21] Appl. No.: 221,130

[22] Filed: Mar. 31, 1994

[51] Int. Cl.$^6$ .................................................. G02B 6/44
[52] U.S. Cl. ........................... 385/109; 385/100; 385/113
[58] Field of Search ............................... 385/100, 101, 385/102, 103–114

[56] References Cited

U.S. PATENT DOCUMENTS

| | | | |
|---|---|---|---|
| 4,701,016 | 10/1987 | Gartside et al. | 385/109 |
| 4,874,219 | 10/1989 | Arroyo et al. | 385/107 |
| 4,938,560 | 7/1990 | Arroyo et al. | 385/107 |
| 4,946,237 | 8/1990 | Arroyo et al. | 385/107 |
| 5,006,806 | 4/1991 | Rippingale et al. | 324/326 |
| 5,017,873 | 5/1991 | Rippingale et al. | 324/326 |
| 5,189,718 | 2/1993 | Barrett et al. | 385/101 |
| 5,305,410 | 4/1994 | Arroyo et al. | 385/109 |
| 5,305,411 | 4/1994 | Arroyo | 385/109 |
| 5,317,665 | 5/1994 | Herrebrugh | 385/101 |

FOREIGN PATENT DOCUMENTS

| | | | |
|---|---|---|---|
| 9203161 | 4/1992 | Germany | 385/100 X |
| WO9010879 | 9/1990 | WIPO | 385/100 X |
| WO9112119 | 8/1991 | WIPO | 385/100 X |
| WO9208923 | 11/1991 | WIPO | 385/100 X |

*Primary Examiner*—Brian Healy
*Attorney, Agent, or Firm*—Donald E. Hayes, Jr.

[57] ABSTRACT

The present invention provides a dielectric optical fiber cable which is capable of being remotely detected while buried. Specifically, this invention incorporates magnetic materials into a layer of epoxy to from a distinct layer within the sheath system of a communications cable. The magnetic particles generate a detection signal which is distinguishable from that generated by a solid metallic pipe and does not adversely affect the operation of existing components of the cable nor does the incorporation of the magnetic marker layer of the present invention unduly limit the speeds at which the overall cable can be manufactured.

21 Claims, 3 Drawing Sheets

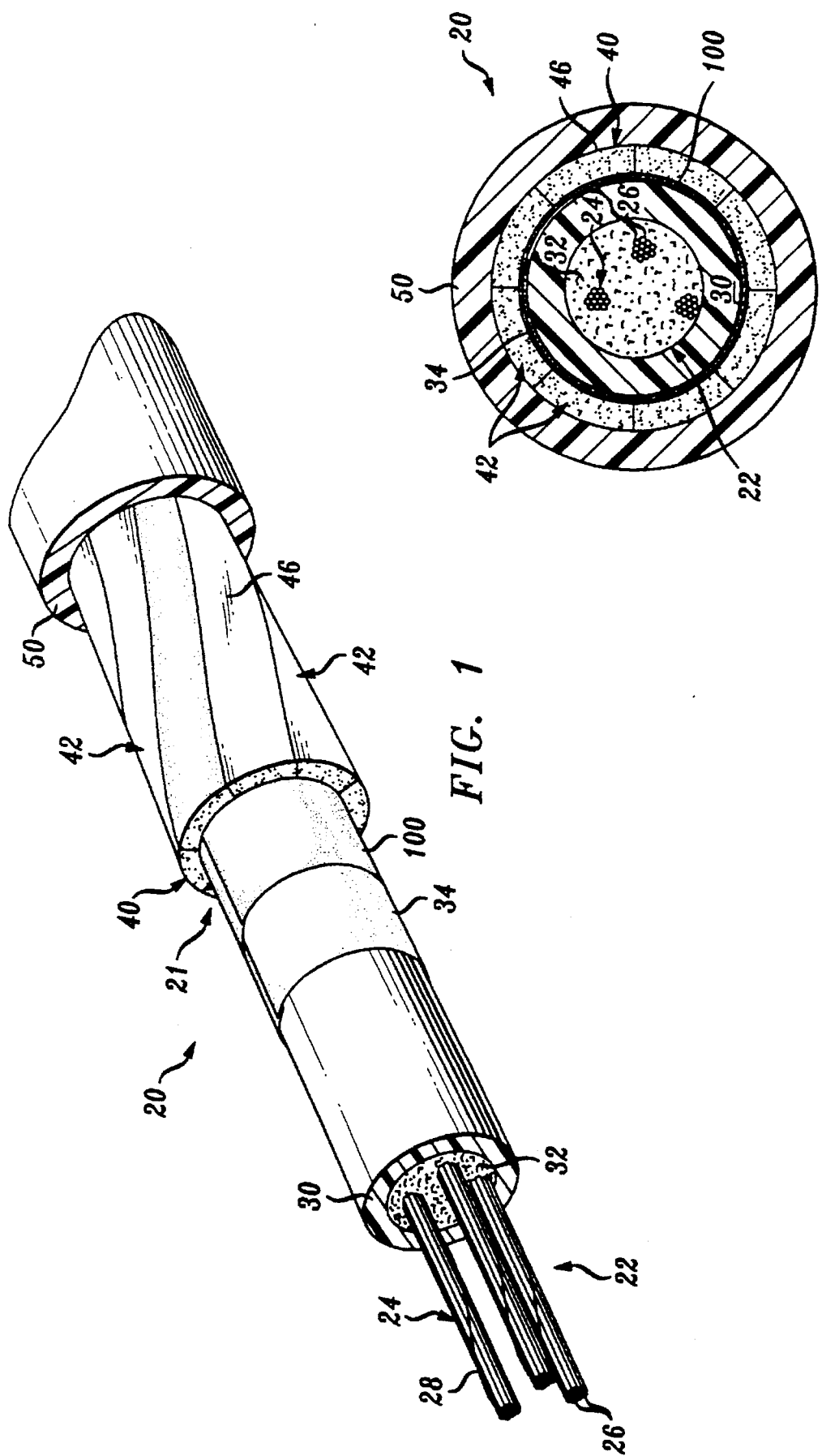

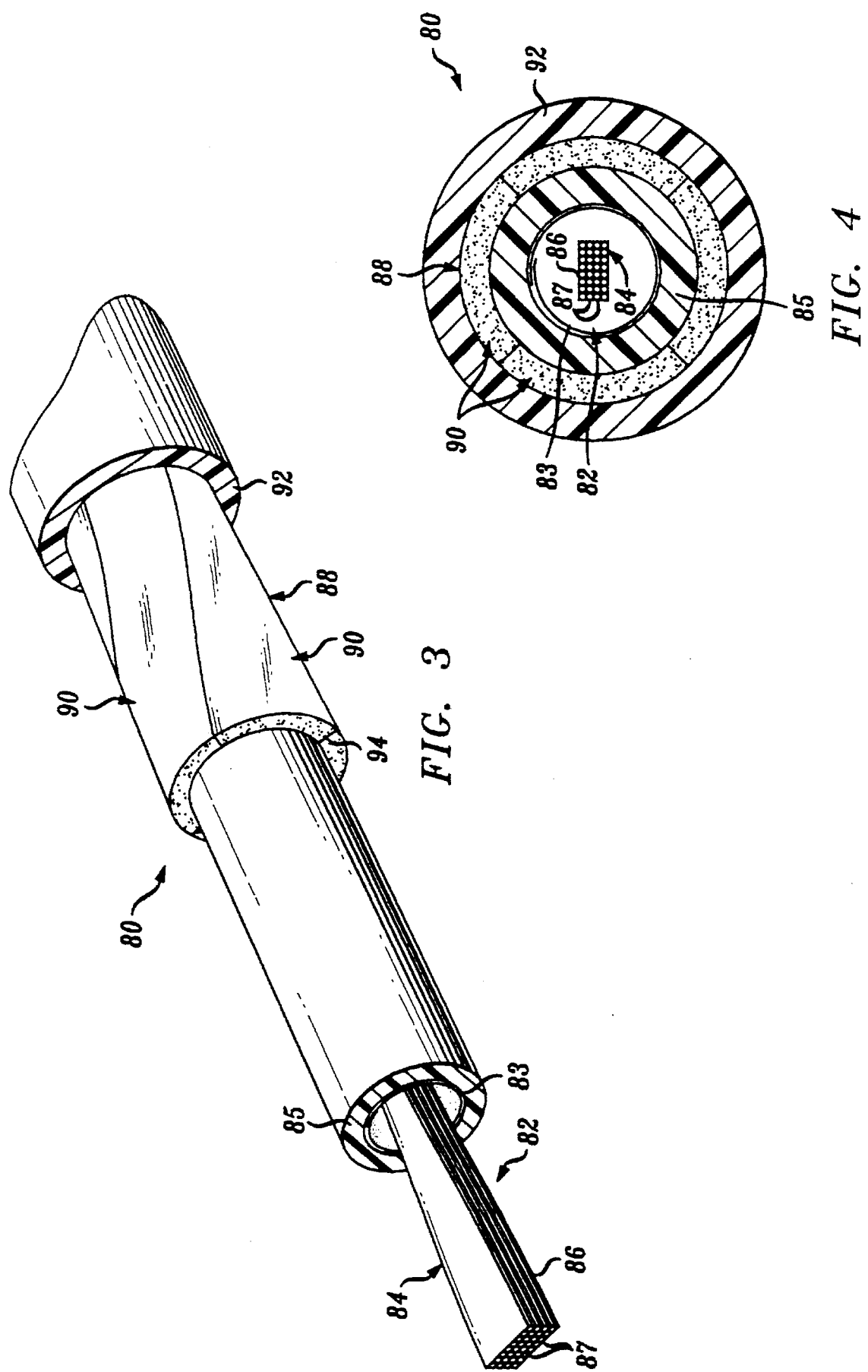

MAGNETICALLY LOCATABLE OPTICAL FIBER CABLES CONTAINING INTEGRATED MAGNETIC MARKER MATERIALS

TECHNICAL FIELD

This invention relates to a magnetically locatable optical fiber cable containing non-metallic permanent magnet marker material. More particularly, the cable design of this invention includes a distinct layer of the non-metallic magnetic material within the sheath system of the cable.

BACKGROUND OF THE INVENTION

Prompt and accurate locating of buried optical fiber cable for maintenance and repair is essential for minimizing disruption in telecommunication service. The two basic types of optical fiber cables presently used in the industry are metallic cables and dielectric (or non-metallic) cables. At present, it is believed that slightly less than one-third of telecommunication systems use dielectric fiber optic cable. However, surveys indicate that many, if not most, would use dielectric cables instead if there existed a reliable and cost-effective method to locate the dielectric cable after it has been buried.

Presently, there are basically two general types of technologies involved in the detection of buried fiber optic cable, magnetic and metallic. In general, the existing magnetic locators consist of either 1) permanent magnetic elements designed or embedded into the cable, or 2) a permanent magnetic-field emitting product which is buried alongside the length of the cable. With these two magnetic-based detection techniques, the residual magnetization generated by the magnetic hysteresis of the permanent magnetic material within the cable may then be detected by a magnetic field sensor. However, due to the inconsistencies in the distribution pattern of the magnetic field, it is often difficult to detect the correct cable when other magnetic members are located nearby. In an additional arrangement, the cable may be positioned within a separate duct which is magnetized.

Alternatively, there exists fiber optic cable locators which are capable of locating cables which were specifically designed to include metallic components, such as a protective sheathing member or a strength member. Such detection methods detect the electromagnetic field emanating from the metal as a result of the application of an alternating current or an alternating magnetic field to the metallic sheathed cable. However, the electric and/or magnetic field generated by the application of an AC electric signal to the cable is often not strong enough to allow a determination of the precise location of the cable. Ineffective low levels of field strength are of a particular interest when attempting to locating cables where the AC signal is transmitted from a remote position and must travel a substantial distance. Additionally, these metallic sheaths are susceptible to damage due to lighting strikes or corrosion.

Commonly, to facilitate detecting a dielectric cable, a copper ground wire is positioned just above the cable. However, the exposed nature of this ground wire makes it very vulnerable to lightning strikes and propagation of the damages to the optical fibers in the cable. Furthermore, when a cable's armor or detection wire is severed by lightning or some other cause, it becomes impossible to apply an electric signal along the cable, thus creating great difficulty in locating and retrieving the cable for repair. Therefore, it is preferable to employ the locating marker inside the cable to ensure locating accuracy.

Other existing detection methods include incorporating a non-conductive tape which has been covered with a magnetic powder such as strontium or barium ferrite or compounding and extruding these magnetic powders in polyethylene or polyvinyl chloride conduits. Both of these methods employ a means of magnetizing a tape and helically wrapping it along the length of the cable or magnetizing a strip along the length of the conduit. Each method also provides a distinctive electronic-detection signature which allows an operator to differentiate between a buried cable and a solid metallic pipe. See U.S. Pat. No. (s) 5,006,806 and 5,017,873 which are assigned to Schondstedt Instrumentation Company of Reston, Va. One other concern with existing techniques is an inability to accurately position and secure the locatable particles as needed within the cable without decreasing the line speed at which the cables can be produced. This is of particular interest in configurations where the locatable particles are placed within portions of the cable which are often extruded, such as the outer jacket.

What is needed and seemingly not available in the prior art is a system which dependably, accurately and cost-effectively locates dielectric (non-metallic) buried cables. Also desirable is a system for locating buried dielectric cables which is readily adaptable to most, if not all, existing cable types. One newly introduced method involves modifying the existing water-blocking tape present in the cable so that the cable becomes magnetically locatable without adversely affecting the operational characteristics of the cable. Such a design is described in commonly assigned and co-pending application U.S. Ser. No. 08/012357, now U.S. Pat. No. 5,305,410. Additionally, a second commonly assigned U.S. Pat. No. 5,305,411 which issued Apr. 19, 1994, discloses introducing magnetic particles into the existing strength members utilized within most cable designs. However, while addressing concerns similar to that of the above-identified applications or patents, the present invention is not directed toward modifying the strength member portion or the waterblocking portion present in most communication cables as taught by the applications identified immediately above, but instead, introduces a polymeric layer which acts to appropriately distribute and position a desired amount of magnetic material throughout the cable length.

The foregoing problems of the prior art have been overcome with the cable of this invention. The present invention provides a dielectric optical fiber cable which is capable of being remotely detected while buried. Specifically, this invention is directed toward an optical fiber cable design which contains a polymeric layer integrated with magnetic marker material and which is separate and distinct from other components of the cable. Furthermore, the present application sets forth methods of producing such an optical fiber cable assembly. Due to the advantages of the cable disclosed in this invention, an operator may achieve reliable remote detection from above ground by using a magnetometer.

SUMMARY OF THE INVENTION

The present invention provides a dielectric optical fiber cable which is capable of being remotely detected while buried. Specifically, this invention incorporates magnetic materials into a layer of polymer matrix material to form a distinct layer within the sheath system of a communications cable. The magnetic particles generate a detection signal which is distinguishable from that generated by a solid metallic pipe and does not adversely affect the operation of existing components of the cable nor does the incorporation of the magnetic marker layer of the present invention unduly limit the speeds at which the overall cable can be manufactured.

BRIEF DESCRIPTION OF THE DRAWINGS

Other features of the present invention will be more readily understood from the following detailed description of specific embodiments thereof when read in conjunction with the accompanying drawings, in which:

FIG. 1 is a perspective view of a dielectric optical cable design in accordance with the present invention;

FIG. 2 is an end cross-sectional view of the cable of FIG. 1;

FIG. 3 is a perspective view of an alternate embodiment of a cable of this invention, FIG. 4 is an end cross-sectional view of the cable of FIG. 3.

DETAILED DESCRIPTION

Figure 5A:
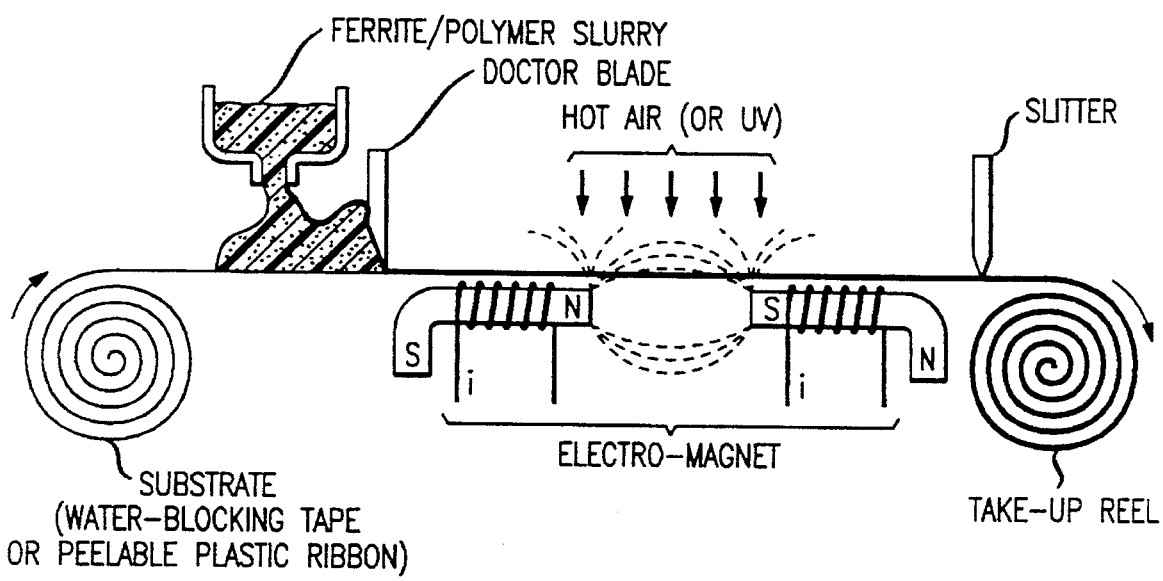
FIGS. 5a and 5b illustrate an exemplary magnetic marker processing system to introduce a desired micro structural signature.

Referring now to FIGS. 1 and 2, there is shown a cable which is designated generally by the numeral 20 and which is a cable having an all-dielectric sheath system 21. The structure is such that it provides excellent protection against rodent attacks and lightning.

As can be seen in FIGS. 1 and 2, the cable 20 includes a core 22 which comprises at least one transmission media. For example, the core 22 may comprise one or more units 24-24 each of which includes a plurality of optical fibers 26-26. Each of the units 24-24 is provided with a binder 28. The unit or units is disposed within a tubular member 30 which is made of a plastic material such as polyethylene, for example.

An inner diameter of the tubular member 30 is such as to control the ratio of the total cross-sectional area of the coated optical fibers within the core to the cross-sectional area defined by the inner surface of the wall of the tubular member. This allows the optical fiber unit or units sufficient movement during handling, installation and temperature cycling to avoid losses due to microbending.

Further, the tubular member, or core tube as it is often called, may be filled with a suitable water blocking material 32. A suitable water blocking material may be one such as that disclosed and claimed in U.S. Pat. No. 4,701,016 which issued on Oct. 20, 1987 in the names of C. H. Gartside, III, et al. and which is incorporated by reference hereinto. However, it should be noted that other well-known types of filling compounds may also be used in accordance with the present invention.

About the core tube is disposed a dielectric armor which is in the form of a shell and which is designated generally by the numeral 40. In the preferred embodiment of the present invention, the shell 40 comprises a plurality of individual preformed segments 42-42. The segments 42-42 are such that they cooperate to provide a generally circular shell 40 for the core tube. Accordingly, each segment 42 is arcuately shaped and is disposed about the core tube such that a surface 46 thereof having the larger radius of curvature is oriented toward the outside of the cable.

Each of the segments 42-42 is made of a dielectric material such as organic or inorganic fibers embedded in a solid dielectric matrix material. In a preferred embodiment, each segment comprises glass fibers embedded in a cured epoxy matrix. However, the material from which the segments are made may be any one of a number of materials which are available commercially. What is important is that such material has relatively high tensile strength, relatively high compressive strength, is non-metallic and is a material which upon contact with the mouths of rodents discourages further attack. Such other materials include, for example, KEVLAR® fiber material, S Glass, T Glass or carbon fiber material in an epoxy matrix.

In the preferred embodiment, glass rods available commercially from the Air Logistics Corp. under the designation E-glass are used. Each shell segment 42 comprises a substrate which includes as many as 4000 continuous unidirectional fiber glass filaments bonded together in an epoxy material matrix. This causes the substrate to become relatively stiff and is rendered capable of withstanding expected compressive as well as tensile stresses. Expected compressive stresses include those which are induced by thermal cycling, and initial shrinkage of the jacket material, for example. In the preferred embodiment, each shell segment 42 is characterized by a tensile stiffness of about 131 kg per one percent strain. Lastly, an outer jacket, preferably made of a plastic material such as polyvinyl chloride (PVC) or polyethylene (PE), surrounds each of the other components. Example of such shell arrangements are more specifically described in commonly assigned U.S. Pat. Nos. 4,874,219, 4,946,237 and 4,938,560.

In another embodiment which is shown in FIGS. 3 and 4, a cable 80 includes a core 82 comprising transmission media 84 and a core tube 85. The transmission media 84 may be enclosed with a core wrap 83 disposed between the transmission media 84 and the core tube 85. The core wrap 83 protects the media 84 during the extrusion of the core tube 85. In this embodiment, the transmission media 84 may include a plurality of stacked ribbons 86-86. Each ribbon 86 includes a planar array of optical fibers 87-87. Enclosing the core tube 85 is a shell 88 comprising a plurality of arcuately shaped segments 90-90. In the particular embodiment shown, the shell 88 comprises four segments 90-90. Over the shell 88 is disposed an outer jacket 92. As in the earlier described embodiment, the jacket 92 may be a plastic material such as polyvinyl chloride or polyethylene. In addition to the components set forth above, this embodiment of the present invention may include a form of known water absorbing materials similar to those described in association with item 34 of the previously discussed embodiment.

The present invention identifies and utilizes three basic parameters which collectively establish the effectiveness of magnetic cable-locating systems. Generally, magnetic detection depends on the following: 1) selecting the proper magnetic material (permanent or soft magnet), 2) determining the optimum magnetic marking or orientation on the cable (magnetize the tape along its width, thickness or length), and 3) selecting a reliable detection device. More specifically, the present invention utilizes these parameters to select and position particular magnetic materials within existing communication cable designs to optimize the ability of an operator to reliably and cost-effectively locate this all-dielectric cable after it has been buried.

With regard to the first parameter involving the selection of the most appropriate type of magnetic material, the distinguishing operational factors of both permanent magnetic materials and soft magnetic materials should be compared. In general, permanent magnets are passive devices in which electromagnetic energy has initially been stored by a large aligning magnetic field. Therefore, permanent magnets are the preferred type of magnetic material for use within a communications cable since they require no externally applied current or force to maintain their magnetic characteristics.

However, it should be noted that while permanent magnetic materials are used in the preferred embodiment, soft magnetic materials may be used in accordance with the present invention within applications where the soft magnetic materials may be conveniently magnetized, such as through induction, in the presence of a stronger field of detection. Nickel zinc ferrite is a soft magnetic material commonly used throughout industry.

The second factor relates to the selection of the most appropriate marking or orientation of the magnetic materials. While the desire to optimally orient the magnetic particles within the cable is briefly mentioned in the two commonly-assigned applications or patents, the present invention more precisely sets forth a number of various orientation options suitable to enhance the detectablity of an all-dielectric communications cable. However, it is understood that variations from the exact orientational arrangements set forth herein may also be acceptable and envisioned in accordance with the present invention.

While a third factor identifies the detection unit as an important point of concern for the overall detection system, it should be noted that any well known detection unit may be used in accordance with the present invention.

Now turning specifically to the cable design in accordance with the present invention, the optical fiber cable disclosed herein comprises, as a magnetic marker, a thin sheet or layer 100 which preferably consists of a high-coercivity permanent magnet powder typically embedded in a polymer matrix. While the preferred embodiment of this invention embeds the magnetic material into a polymer matrix, any securing method which allows the magnetic particles to be positioned within the selected location of the cable in a manner that allows manipulation of the particles orientation and then can be modified to prohibit further undesired movement of the particles. Additionally, for the sake of compactness and for the sake of minimizing the adverse influence on various other components in the cable, the layer of magnetic marker material should be as thin, or compact, as possible while providing as much magnetic flux as possible for easier magnetometer detection at distances at least 3 feet away and preferably as far away as ≈6 feet.

The marker material is preferably placed outside the tubular member 30 so as not to interfere with the operation of the optical fibers positioned inside the core tube 30, and preferably inside the outermost jacket 50 to maintain compactness and ensure durability of detection. In accordance with this invention the marker material constitutes a distinct layer 100. In a preferred embodiment, the thin magnetic marker layer 100 is placed underneath or above the layer of water-blocking tape or material present in most cable designs. In an alternative embodiment, the magnetic marker layer 100 may take the position of the water-blocking tape with the appropriate water-blocking (or water-absorbing) polymer powder coated on one or both surfaces of the magnetic marker layer 100. Additionally, it should be noted that the magnetic marker layer 100 of the present invention may occupy a variety of different positions within the cable and still be deemed to be within the scope of this invention. Specifically, the magnetic marker layer 100 may be positioned immediately outside core tube 30 or immediately inside outer jacket 50. Each of these configurations may be achieved through the use of a co-extrusion process.

The incorporation of permanent magnet powder into the core tube 30 or outer jacket 50 is not precluded in accordance with the present invention, but care has to be taken in order not to deteriorate the processability (formability) of these tubes during cable assembly or their mechanical properties and durability. Additionally, any adverse effects to the operation of the fibers as a result of the close proximity of the magnetic materials to the fibers should also be considered when deciding exactly where to position the marker material within a communications cable.

The magnetic marker layer 100 of the invention may be prepared by 1) mixing demagnetized permanent magnet powder such as strontium ferrite with a viscous medium such as an uncured elastomer, epoxy, or other types of polymers, 2) spreading or spraying the mixture into a thin sheet geometry on a flat substrate or porous cloth, 3) curing the medium by heat, catalyst or other means, and optionally peeling it off the substrate. The marker material may then be magnetized to impart permanent magnet behavior to the particles. Any number of techniques may be used to place the generated layer at the desired position within the cable, either before or after magnetization. Additionally, as an alternative to the spreading or spraying step described above, the mixture may be applied to the cable by an extrusion or co-extrusion process which establishes the magnetic layer 100 over the core tube 30 or under the outer jacket 50.

A random distribution of the magnet powder in the polymer may provide sufficient magnetic flux signal for magnetic detection under certain conditions of ample marker volume, and close measurement distance, etc., and hence such a distribution is not excluded from the invention. However, it has been discovered that significantly improved detection signal is obtained if the magnet particles are linearly aligned into continuous chains, e.g., by applying magnetic field before the curing of the viscous matrix material is completed, and at the same time the cured composite marker is magnetized in the same direction as the alignment direction. This improvement by particle alignment appears due to the combined effect of rotating each randomly oriented particle toward its most favorable magnetic anisotropy direction (magnetically strongest crystal orientation) and reducing by chain formation the air gap leakage of magnetic flux through the spacing between the particles. While reference is made herein to the desirability of certain orientations, alignments and/or magnetizations of the individual magnetic particles, a commonly assigned application filed on the same date as this application addresses these concepts in greater detail.

The permanent magnet powder is preferably non-metallic (non-conducting) particles such as barium ferrite ($BaO \cdot 6 Fe_2O_3$) or strontium ferrite ($SrO \cdot 6 Fe_2O_3$) or their mixture. These magnet materials have high coercive force to resist self-demagnetization, are relatively safe in terms of lightning damages, are of low cost, and have good corrosion resistance. Metallic magnet particles (isotropic or elongated shape) such as $Sm\ Co_5$, $Sm_2\ Co_{17}$, $Nd_2Fe_{14}B$, Alnico, Fe-Cr-Co, or a mixture thereof, may also be used as a constituent in the magnetic marker material provided that these metallic particles are aligned so as to avoid long-range continuity and lightning propagation. For example, these particles may be aligned not along the marker length direction but along the transverse direction of the strip by applying a magnetic field perpendicular to the length direction, or along the vertical direction by applying the field perpendicular to the plane of the marker strip. The magnetization of the cured marker material is carried out in the same direction as the alignment direction for maximum detection signal.

The polymer matrix materials before curing should have adequate fluidity for convenient mixing with magnetic powder and easy movement of magnetic particles for alignment.

After suitable magnetic alignment of particles, the polymer is cured or solidified to retain the aligned structure by heating, catalyst, exposure to ultraviolet light, etc., depending on the nature of the polymer matrix material. Some of the desirable characteristics of the polymer matrix material include suitable mechanical strength and bendability for cable assembly purpose, durability for temperature variations and aging, and high breakdown voltage.

The polymer can be epoxy-type adhesives, elastomers, polyurethane, polyethylene, polyamid, polybutylene, polyvinyl chloride, etc. Non-polymeric matrix can also be used if it has suitable viscosity and can be solidified after alignment of magnetic particles. For example, gelatin, latex or flour optimally diluted in water or other liquid may be mixed with the magnet powder, and spray-coated or doctor-bladed on a thin substrate (e.g., Mylar sheet) for processing. The magnetic marker composite may be in the form of thin sheet (most desirable), rod, wire, etc. The marker material can be free-standing, can be used attached on a substrate sheet or substrate rod, or can be applied to fill up pores in a porous cloth-type substrate material. Doctor-blading, dip-coating, spray coating, extrusion, and other well known ceramic or polymer processing techniques may be used to shape the marker.

The upper limit of desirable size of the magnetic particles depends on the thickness of the magnetic marker material. The typical useful particle size is in the range of 1–100 μm, preferably 5–50 μm. The volume fraction of magnetic particles depend on the requirements for magnetic signal, its effect on viscosity/processability of the composite marker, its effect on the mechanical and other properties of the cured composite, and so on. Typical desirable volume fraction is in the range of 2–80%, and preferably 10–50% in volume.

Figure 5B:
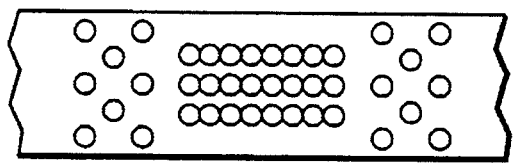

The alignment of magnetic particles in the viscous medium, e.g., in the doctor-bladed state, may be accomplished by applying a constant DC field or a pulse field with sufficient duration to allow rotation and movement of magnetic particles. A permanent magnet or electromagnet may be used to provide the field. Typical field strength ranges from 20–50,000 Oe and preferably from 100–3000 Oe. FIGS. 5a and 5b illustrate an exemplary magnetic marker processing system to introduce a desired micro structure signature.

It is to be understood that the above-described arrangements are simply illustrative of the invention. Other arrangements may be devised by those skilled in the art which will embody the principles of the invention and fall within the spirit and scope thereof.

We claim:

1. An optical fiber cable, which includes:
   a core comprising at least one optical fiber transmission medium;
   a tubular member in which is disposed said core; and
   a sheath system which is disposed about said tubular member and comprises non-metallic magnetic material embedded in a cured epoxy matrix and which enables the cable to be magnetically locatable.

2. The cable of claim 1 wherein the magnetically locatable material generates a detection signal which is distinguishable from that generated by a solid metallic pipe.

3. The cable of claim 1, wherein said magnetically locatable material is a powder.

4. The cable of claim 1, wherein said magnetic material is selected from the group consisting of strontium ferrite, barium ferrite, and neodymium iron boron, samarium cobalt, Alnico and iron-chromium-cobalt.

5. The cable of claim 1, wherein said magnetic material is microbial resistant.

6. The cable of claim 1, wherein said magnetic material is positioned within the cable by two longitudinally extending tapes, each comprising a non-cellulosic material.

7. The cable of claim 1, wherein said magnetic material is positioned within the cable by two longitudinally extending cellulosic based tapes, each having been treated with a microbial resistant material.

8. The cable of claim 1, wherein the layer of magnetically locatable material is optimized to provide sufficient flexibility and so as not to impede the alignment of the members during manufacture of the cable.

9. An optical fiber cable, which includes:
   a core comprising at least one optical fiber transmission medium;
   a tubular member in which is disposed said core; and
   a dielectric sheath system which is disposed about said tubular member and includes a plurality of longitudinally extending segments and wherein the sheath system comprises non-metallic magnetic material which enables the cable to be magnetically locatable.

10. The cable of claim 9 wherein the magnetically locatable material generates a detection signal which is distinguishable from that generated by a solid metallic pipe.

11. The cable of claim 9, wherein said magnetically locatable material is a powder.

12. The cable of claim 9, wherein said magnetic material is selected from the group consisting of strontium ferrite, barium ferrite, and neodymium iron boron, samarium cobalt, Alnico and iron-chromium-cobalt.

13. An optical fiber cable, which includes:
   a core comprising at least one optical fiber transmission medium;
   a tubular member in which is disposed said core; and
   a sheath system which is disposed about said tubular member and which comprises non-metallic magnetic material concentrically disposed along the length of the cable and which enables the cable to be magnetically locatable.

14. The cable of claim 13 wherein the magnetically locatable material generates a detection signal which is distinguishable from that generated by a solid metallic pipe.

15. The cable of claim 13, wherein said magnetically locatable material is a powder.

16. The cable of claim 13, wherein said magnetic material is selected from the group consisting of strontium ferrite, barium ferrite, and neodymium iron boron, samarium cobalt, Alnico and iron-chromium-cobalt.

17. An optical fiber cable, which includes:
   a core comprising at least one optical fiber transmission medium;
   a tubular member in which is disposed said core; and
   a sheath system which is disposed about said tubular member and which comprises non-metallic magnetic material disposed in a longitudinal strip along the length of the cable and which enables the cable to be magnetically locatable.

18. The cable of claim 17, wherein the longitudinal strip of magnetic material is positioned helically about the tubular member.

19. The cable of claim 17 wherein the magnetically locatable material generates a detection signal which is distinguishable from that generated by a solid metallic pipe.

20. The cable of claim 17, wherein said magnetically locatable material is a powder.

21. The cable of claim 17, wherein said magnetic material is selected from the group consisting of strontium ferrite, barium ferrite, and neodymium iron boron, samarium cobalt, Alnico and iron-chromium-cobalt.

* * * * *